April 13, 1926.
M. L. MARTUS ET AL
1,580,750
BATTERY ELEMENT SUSPENSION MEANS
Filed March 11, 1925   2 Sheets-Sheet 1
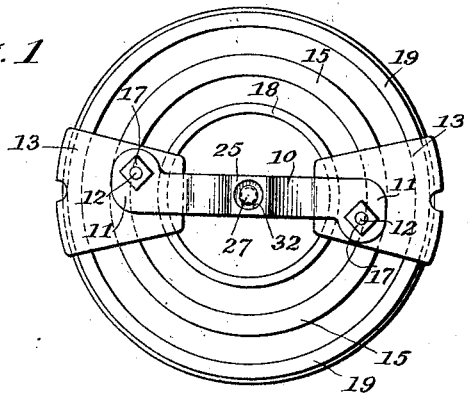
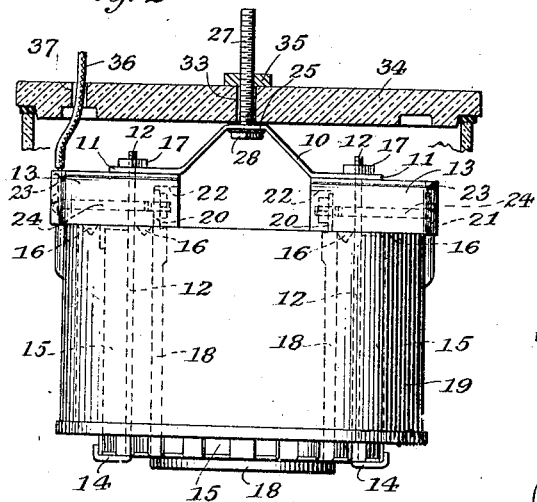
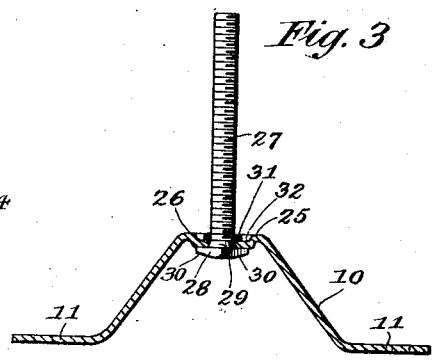
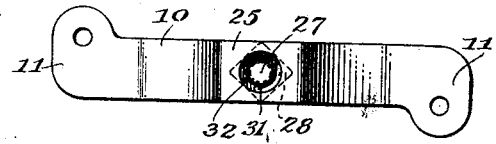
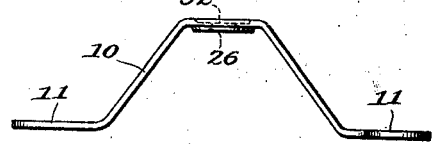
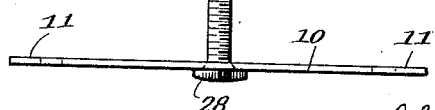
INVENTOR.
Martin L. Martus,
Edmund H. Becker, and
BY James G. Ross
Chamberlain & Newman ATTORNEYS.

April 13, 1926.
M. L. MARTUS ET AL
1,580,750
BATTERY ELEMENT SUSPENSION MEANS
Filed March 11, 1925   2 Sheets-Sheet 2
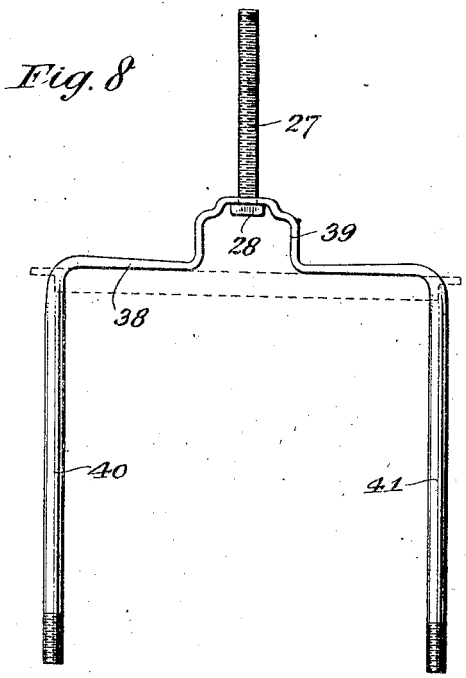
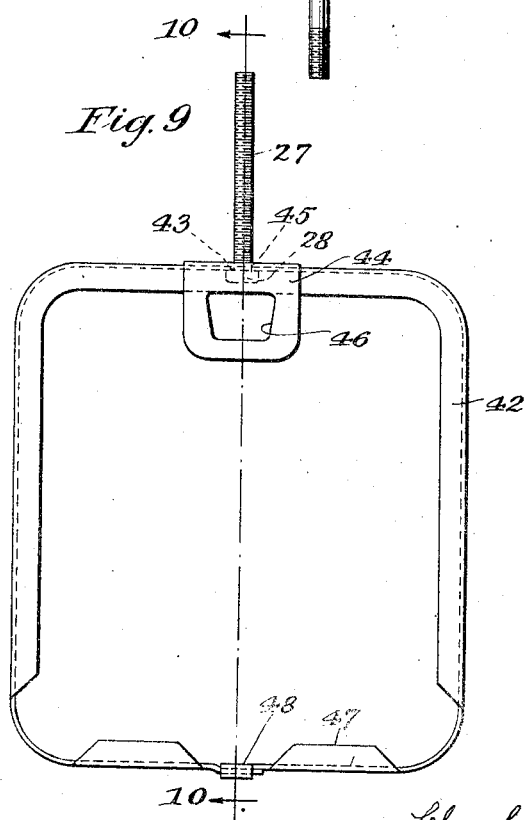
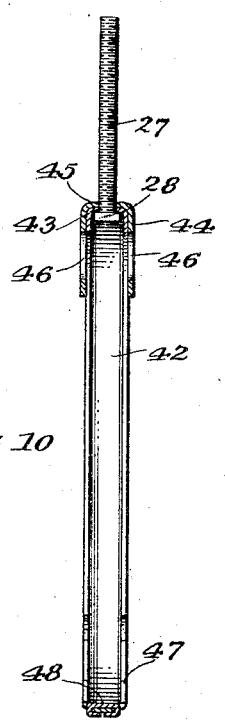
INVENTOR.
Martin L. Martus,
Edmund H. Becker, and
BY James G. Ross
Chamberlain & Newman ATTORNEYS.

Patented Apr. 13, 1926.

1,580,750

UNITED STATES PATENT OFFICE.

MARTIN L. MARTUS, OF WOODBURY, AND JAMES G. ROSS AND EDMUND H. BECKER, OF WATERBURY, CONNECTICUT.

BATTERY-ELEMENT SUSPENSION MEANS.

Application filed March 11, 1925. Serial No. 14,847.

*To all whom it may concern:*

Be it known that MARTIN L. MARTUS, of Woodbury, and JAMES G. ROSS and EDMUND H. BECKER, of Waterbury, in the counties of Litchfield and New Haven, respectively, and State of Connecticut, citizens of the United States, have invented certain new and useful Improvements in Battery-Element Suspension Means, of which the following is a specification.

The present invention relates to improvements in primary batteries and methods of producing the same, and especially that class of batteries in which the negative and positive electrodes are supported as a unit assembly within a jar by a single suspension means, as a central rod or hanger. The invention consists more particularly in the method for securing such central rod or hanger to a frame or yoke member in a manner to provide an economical and practical connection, which will not deteriorate in use, and will enable the hanger to reliably support the electrode assembly in its proper relation within the battery jar.

A feature of the invention consists in connecting the central supporting rod or hanger with the supporting frame or yoke by welding or fusing the same and applying pressure, so that an integral and interlocking relation is produced between them, the latter operation further serving to force the metal of the rod or hanger through an aperture provided in the frame in a manner to provide an interlocking fin.

Another object is to provide a connection which will render the central portion of the frame member, and upon which the greatest strain is placed, of relatively greater strength to withstand bending and distortion than the other portions, this central portion in the usual form being considerably weakened by reason of the perforation therein.

A further object of the invention is to provide a one piece frame and hanger in which the several elements of the battery are contained and by means of which the assembled elements may be supported from a cover of a jar by a single means and whereby both the assembling and disconnecting of the elements may be readily effected.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a top plan view of an electrode assembly unit, provided with a supporting rod and frame member formed integral according to the present embodiment of the invention;

Fig. 2 is a side elevation of the assembly unit, and showing the same attached to the jar cover, shown in section;

Fig. 3, is a detail enlarged sectional view of the combined rod and frame member, shown in Figs. 1 and 2;

Fig. 4 is a top plan view thereof;

Fig. 5 is a side view of the threaded supporting rod employed, and before attachment to the frame member;

Fig. 6 is a side view of the frame member, shown in the preceding figures;

Fig. 7 is a side view of a modification in which the frame member is in the form of a straight piece;

Fig. 8 is a side view including a further modification of frame portion;

Fig. 9 is a side view of a still further modification of frame, and

Fig. 10 is a sectional view thereof on line 10—10 of Fig. 9.

Referring to the drawings, the supporting frame or yoke 10, to the center of which the single supporting rod or hanger is attached according to the invention, supports the entire electrode assembly unit, and for this purpose is provided at its ends with oppositely projecting perforated ear portions 11 in which are engaged the upper threaded ends of hanger rods 12, extending through suitable passages provided in procelain insulating blocks 13, and provided at their lower ends with hook portions 14 engaged about the lower end of a cylindrical negative electrode element 15, of compressed copper oxide or the like, the upper end of which is engaged in arcuate recesses formed on the under side of the blocks by ribs 16, the parts being secured by nuts 17 engaged upon the upper threaded ends of the rods, whereby the frame is secured to the blocks and the electrode clamped thereto.

The blocks also have supported thereon inner and outer cylindrical positive electrodes 18 and 19, of zinc, annularly spaced from the electrode 15 and provided at their respective upper ends with upstanding apertured lugs 20 and 21 engaged in recesses 22 and 23 provided in the inner and outer walls of the blocks, and secured by bolts 24 engaged in suitable transverse passages through the blocks. Thus the frame portion supports the entire electrode assembly in properly spaced and insulated relation.

In the form of the invention illustrated in Figs. 1 to 6, the frame 10 is bent upwardly at its intermediate portion between the end portions 11 at inwardly inclined angles to provide a central horizontal raised portion 25, and the invention consists more particularly in the manner in which the central supporting threaded rod or hanger is secured to this portion. Heretofore this has been accomplished by perforating the frame centrally, engaging the rod therein so that its head abuts the under surface of the frame, then screwing a nut down upon the threaded rod and against the upper surface of the frame. This latter practice not only provided an unreliable and expensive support, but one which would become loose and deteriorate under the conditions accompanying the use of a battery.

According to the invention, a central aperture 26 is provided in the portion 25, and the wall of which is slightly tapered to provide an annular beveled seat. The threaded hanger rod 27 is provided at one end with a square head 28, and adjacent the head is tapered, as at 29, to form a seat engaging portion, which when the rod is engaged in the aperture centralizes the same and provides a substantially solid support, irrespective of slight variation in the diameter of the rod and aperture. The head 28 may be shaped round, rectangular or square and is positioned with its edges diagonally disposed, as shown in Fig. 4, is thereupon simultaneously subjected to pressure against the under side of the portion 25 by electric spot welding, the spot welds being preferably near the periphery of the head, as indicated by the flattened portions 30, Fig. 3. These spot welds cause an integral jointure of the head with the frame, and the simultaneously applied pressure causes a fin 31 to be pressed upwardly through the aperture 26 about the rod, and which serves to more securely connect and interlock the parts. In order to avoid filing away of this fin to produce a flat upper bearing surface, the portion 25 is slightly dished, as at 32, in concentric annular relation to the aperture so that the fin is confined below the level of the flat upper surface of the portion 25 and a proper bearing may therefore be obtained.

The positioning of the head and the integral connection of the same to the frame member provides a strengthened area at the central portion of the frame where the greatest strain is placed, and which under ordinary conditions would be considerably weakened by the aperture.

In connecting the electrode assembly in the jar, the rod 27 is engaged in the central passage 33 of the jar cover 34, the flat portion 25 of the frame member snugly engaging upon the under surface of the cover and being clamped against it by means of a nut 35 screwed down on the rod and engaging the upper surface of the cover. One lead wire (not shown) is connected to the rod 27, while another wire 36 is passed through a hole 37 in the cover and is connected to the positive electrodes beneath the head of the bolt 24.

In Fig. 7 there is illustrated a modification, in which the frame member is of straight form, instead of being bent upwardly as in the first form, this being desirable with certain types of assemblies, as is well known.

In Fig. 8 there is illustrated a further modification in which a frame member is shown that is particularly adapted for plate forms of electrodes, said frame being bent upwardly centrally of its transverse portion 38 into inverted U-shape as at 39, and at the ends of the portion 38 there are provided integral downwardly extending side members 40 and 41, threaded at their lower ends and adapted in practice to retain a plate electrode within the frame by means of a bottom cross yoke member and nuts, not shown, whereby the electrode is secured within the hanger in a manner to be supported from the single suspension rod.

The portion 39 is apertured and the threaded hanger rod 27 is secured thereto by welding and pressure in a similar manner to the other forms.

In Figs. 9 and 10 a still further modification is illustrated, in which the frame member is in the form of a one-piece sheet metal channeled frame 42 adapted to be clamped about a plate electrode, the upper portion of the frame being centrally apertured, as at 43, and provided with an inverted U-shaped member 44 having an aperture 45 in its upper portion registering with the aperture 43, and being provided in its sides with apertures 46. The threaded hanger rod 27 is secured by welding and pressure in a similar manner to the other forms, the welding action serving also to secure the member 44 to the frame, so that no other securing means are necessary for this purpose.

In practice when assembling the negative electrode in this frame, the same is positioned within and against the top and side members, after which the bottom end portions 47 are bent in under the electrode plate and their ends connected as shown at 48 by being bent about each other.

In the several illustrated embodiments of the invention the connection between the central hanger rod and the frame member connected to the electrode provides a jointure of great strength, which will not loosen or deteriorate in use, and which therefore insures positive electrical conductivity from the electrode to the hanger rod under all conditions.

In the claims the words "frame member" are employed as a generic term to cover any type of member, as a yoke, bridge or plate, intermediate the electrodes and the hanger rod and which in part serves to support the electrodes from the cover and provide for means to insulate the positive electrode from the negative.

We have illustrated and described preferred and satisfactory embodiments of the invention, but it will be obvious that changes may be made therein, within the spirit and scope thereof, as defined in the appended claims.

Having thus described our invention, what we claim and desire to secure by Letters Patent is:—

1. A primary battery element suspension means comprising a single centrally disposed hanger rod and an electrode frame member welded thereto without the addition of foreign material.

2. A hanger for an assembled primary battery unit adapted to be removably suspended from the cover of a battery jar, comprising a centrally apertured frame adapted to be connected to said unit, a single central suspension rod provided at one end with a head and engaged in said aperture with said head abutting one side of said frame and integrally secured thereto by pressure and welding and without the addition of foreign material.

3. A hanger for an assembled primary battery unit adapted to be removably suspended from the cover of a battery jar, comprising a centrally apertured frame adapted to be connected to said unit, a suspension rod provided at one end with a squared head and engaged in said aperture with said head abutting one side of said frame and diagonally disposed to provide an elongated strengthening brace structure at the center, said head being integrally secured to said frame by pressure and welding and without the addition of foreign material.

4. A hanger for an assembled primary battery unit adapted to be removably suspended from the cover of a battery jar, comprising a centrally apertured frame adapted to be connected to said unit, a suspension rod provided at one end with a head and engaged in said central aperture with said head abutting one side of said frame and integrally secured thereto by pressure and welding and without the addition of foreign material.

5. A hanger for an assembled primary battery unit adapted to be removably suspended from the cover of a battery jar, comprising a centrally apertured frame member adapted to be connected to said unit, a central suspension rod provided at one end with a head and engaged in said aperture with said head abutting one side of said frame member and integrally secured thereto by the simultaneous application of pressure and welding, and a fin extending from said head through said aperture about the portion of said rod adjacent said head.

6. A hanger for an assembled primary battery unit adapted to be removably suspended from the cover of a battery jar, comprising a centrally apertured frame member adapted to be connected to said unit and provided with a recess surrounding said aperture, a suspension rod provided at one end with a head and engaged in said aperture with said head abutting one side of said frame and integrally secured thereto by the simultaneous application of pressure and welding, and a fin extending from said head through said aperture about the portion of said rod adjacent said head, said fin being confined within said recess below the upper surface of said frame.

Signed at Waterbury, in the county of New Haven and State of Connecticut, this 7th day of March A. D. 1925.

MARTIN L. MARTUS.
JAMES G. ROSS.
EDMUND H. BECKER.